United States Patent [19]
Tiffany et al.

[11] 3,763,374
[45] Oct. 2, 1973

[54] DYNAMIC MULTISTATION PHOTOMETER-FLUOROMETER

[75] Inventors: Thomas O. Tiffany; James C. Mailen, both of Oak Ridge; Louis H. Thacker, Knoxville, all of Tenn.

[73] Assignee: The United States of America as represented by the United States Atomic Energy Commission.

[22] Filed: Aug. 22, 1972

[21] Appl. No.: 282,814

[52] U.S. Cl. .................. 250/363, 250/432, 356/246
[51] Int. Cl. .............................................. G01t 1/20
[58] Field of Search .................... 250/71 R, 71.5 R, 250/363, 432; 356/246; 23/230 B, 252 R

[56] References Cited
UNITED STATES PATENTS
3,649,833  3/1972  Leaf .................................. 250/71 R
3,547,547  12/1970  Anderson ............................ 356/246

*Primary Examiner*—James W. Lawrence
*Assistant Examiner*—Davis L. Willis
*Attorney*—John A. Horan

[57] ABSTRACT

An analytical photometer-fluorometer is provided for simultaneously determining solute concentration in a multiplicity of discrete samples. A multiplicity of sample analysis chambers or cuvettes are arranged in a circular array within a centrifuge rotor to provide a rotary cuvette system. Each cuvette is provided with a shallow portion (0.1 – 0.2 cm depth) having a transparent window on one side only for making fluorometric measurements and a portion having greater depth ($\approx 1$ cm) and transparent windows on both sides for making photometric measurements. A photometer light source and a photodetector are disposed on opposite sides of the centrifuge rotor to make photometric measurements of the cuvette contents. A fluorescence excitation light source is disposed on the same side of the rotor as the photodetector and oriented to direct a light beam at an angle into the shallow portion of each cuvette.

3 Claims, 7 Drawing Figures

DYNAMIC MULTISTATION PHOTOMETER-FLUOROMETER

BACKGROUND OF THE INVENTION

The invention relates generally to solute concentration measuring instruments and more particularly to a combined dynamic multistation photometer-fluorometer. It was made in the course of, or under, a contract with the U. S. Atomic Energy Commission.

In an instrument which is to be used as both an absorption photometer and a fluorometer, the most obvious arrangement is that where a light source is disposed on one side of a sample-holding cuvette and a photodetector on the other. Light, at a specific wavelength, is passed through the cuvette and the emerging beam detected. Appropriate filters eliminate the excitation light and pass only the emitted fluorescence produced in the liquid where fluorescence is measured. Similar arrnagements are widely used in fast analyzers such as those described in U.S. Pat Nos. 3,547,547 and 3,555,284, of common assignee. In practice, however, fluorometric measurements are not readily obtained from such an arrangement because of difficulties in obtaining signals significantly different from that of the background noise. The elimination of interfering excitation light may also be accomplished by angled excitation emission detection wherein the excitation beam is oriented 90° with respect to the photodetector which measures the emitted fluorescence.

Another problem associated with determining solute concentration by fluorescence measurements occurs where the sample is characterized by relatively high absorbancy. That portion of the sample between the cuvette window and a sample incremental volume element attenuates the excitation beam and thus reduces the fluorescence emitted. The emitted radiation is attenuated in much the same manner although to a lesser degree than that associated with the exciting beam. This problem is referred to as the "inner filter effect."

It would thus be desirable to provide an optical configuration for fluorescence measurements wherein the path lengths of the excitation beam and emitted beam are short. In such a configuration, errors due to the inner filter effect would be minimized and the effective solute concentration range of the fluorometer extended.

Photometric measurements, on the other hand, require an optical configuration wherein a relatively long path length ($\approx 1$ cm) must be provided the incident light beam before an effective range of solute concentration can be measured. Thus the cuvette path length requirements associated with photometric measurements are in conflict with the cuvette path length requirements for fluorometric measurements.

It is, accordingly, a general object of the invention to provide a dynamic, multistation, fast analyzer wherein both photometric and fluorometric measurements can be made.

Another, more particular object of the invention is to provide a dynamic, multistation, fast analyzer having a cuvette design which is amenable to both photometric and fluorometric measurements.

Other objects of the invention will be apparent from an examination of the following description of the invention and the appended drawings.

SUMMARY OF THE INVENTION

In accordance with the invention, a dynamic, multistation, fast analyzer is provided which is capable of performing both photometric and fluorometric measurements. A multiplicity of specially designed sample analysis cuvettes are disposed in a circular array within a centrifuge rotor to form a rotary cuvette system. Each cuvette is provided with a shallow portion with a transparent window on one side only for the making of fluorometric measurements and a portion having greater depth and transparent windows on both sides for making photometric measurements. A fluorescence excitation light souce provides an angled beam of excitation light which is incident on the shallow cuvette portion. A photometric light source is disposed on the opposite side of the rotor and provides a light beam incident on the cuvettes at a position where their depth is greater. A photodetector is positioned to receive either the emitted fluorescence or the transmitted beam from the photometric light source to provide fluorometric and/or photometric measurements of the cuvette contents.

DESCRIPTION OF THE PREFERRED EMBODIMENT

Figure 1:
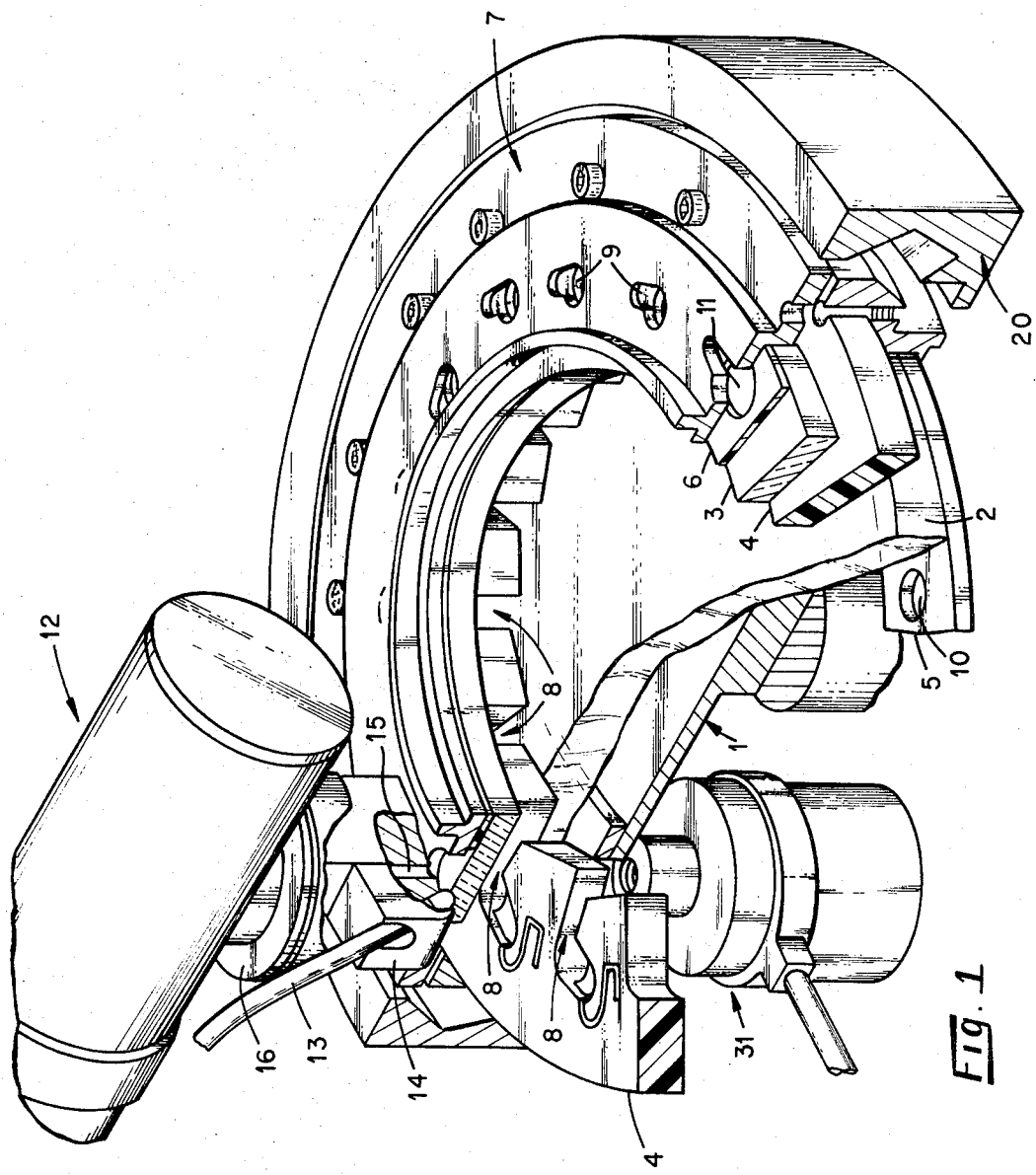
FIG. 1 is an isometric view, partially cut away, of a dynamic, multistation fluorometer-photometer made in accordance with the invention.

FIG. 1 is an isometric view, partially cut away, showing a combination dynamic, multistation fluorometer-photometer made in accordance with the invention. A generally pancake-shaped rotor assembly comprises a flanged steel rotor body 21, quartz windows 2 and 3, a slotted polytetrafluoroethylene cuvette ring 4 sandwiched between quartz windows 2 and 3, polytetrafluorethylene retaining rings 5 and 6, and a steel bolted flange ring 7. Retaining rings 5 and 6, windows 2 and 3, and cuvette ring 4 are compressed between rotor body 1 and flange ring 7 to form a multiplicity of radially oriented cuvettes 8 in slotted cuvette ring 4. Spaced holes 9, 10, and 11 are respectively provided in flange ring 7 and retaining rings 5 and 6 in axial alignment with cuvettes 8 to permit passage through the cuvettes 8 of a light beam from a photometer or spectrophotometer light pipe and mirror assembly 31 disposed below the rotor to a photodetector 12 disposed above the rotor assembly. A fluorescence excitation light pipe 13 is secured by a surface fluorescence excitation and emission detector head assembly 14 which is positioned immediately above flange ring 7 in register with holes 9. Light pipe 13 is angled with respect to photodetector 12 in order to provide angled fluorescence emission detection. Head assembly 14 positions light pipe 13 with respect to an emission window 15 leading to photodetector 12. An emission filter holder or monochromator assembly 16 is disposed intermediate head assembly 14 and photodetector 12.

Figure 2:
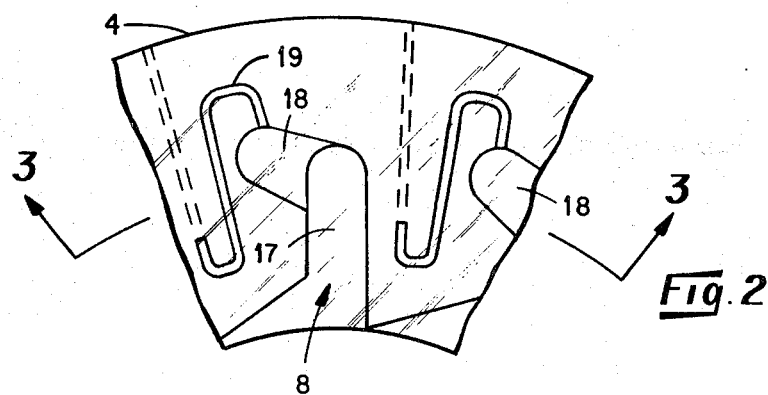
FIG. 2 is a plan view of a portion of the rotor used in the fluorometer-photometer of FIG. 1 showing the shape of the cuvettes used therein.
Figure 3:
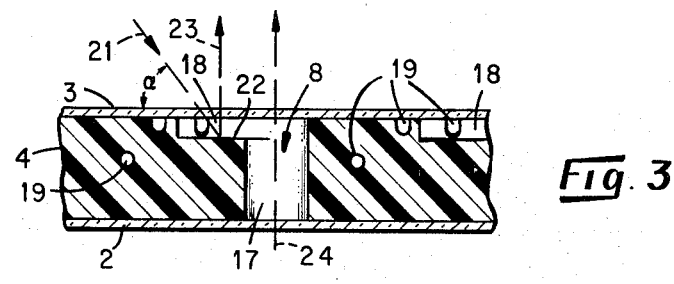
FIG. 3 is a sectional view of the rotor portion of FIG. 2 illustrating the action of light beams in performing fluorometric and photometric measurements of the cuvette contents.

Referring now to FIGS. 2 and 3, cuvettes 8 are shown in a preferred configuration. As shown, each cuvette 8 has a first portion 17 which extends axially through cuvette ring 4 and a shallow stepped portion 18 along one side of the cuvette. A fluid removal siphon 19 extends from the radial extremity of each cuvette to the periphery of cuvette ring 4 where it discharges into a stationary collection trough 20 as shown in FIG. 1. Fluorescence measurements are made in shallow portion 18 where the in-liquid path length of the excitation beam 21 is restricted to 0.2 centimeter or less. Excitation beam 21 is oriented at an angle, $\alpha$, of about 30° with respect to window 3 and surface 22 of shallow portion 18. This permits detection of emission beam 23 at an angle other than the angle of reflection normally associated with radiation incident on surface 22. Light beam 24 provides photometric measurements through portion 17 of each cuvette in accordance with the teaching of U.S. Pat. No. 3,555,284, of common assignee.

Figure 4:
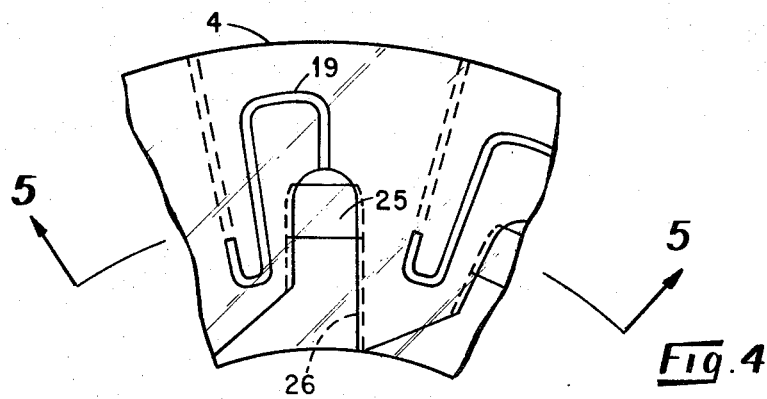
FIG. 4 is a plan view of an alternative cuvette design wherein inserts are used to provide shallow portions in the cuvettes.
Figure 5:
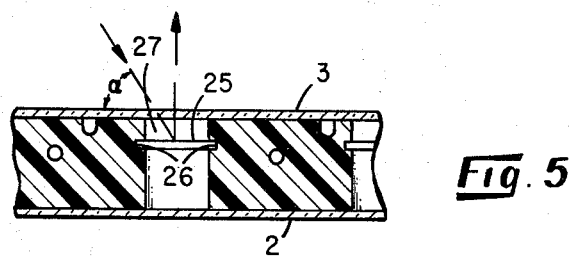
FIG. 5 is a sectional view of the rotor assembly of FIG. 4.

FIGS. 4 and 5 illustrate an alternative cuvette design wherein an opaque shim 25 is inserted within grooves 26 in the sides of a cuvette to create a shallow portion 27 within the cuvette having a depth suitable for fluorometric measurements. Fluorometric measurements are made in the shallow portion 27 and photometric measurements are made in the remaining portion of the cuvette not modified by insertion of shim 25. Existing photometric analyzers of the rotary cuvette type can be easily modified in accordance with this embodiment by machining grooves in the sides of the cuvettes and inserting suitable shims.

Where, as shown in FIG. 1, only a single photodetector is used to detect both the emitted fluorescence and the transmitted beam from the photometer source, the fluorometric and photometric measurements cannot be made simultaneously. The system described in FIG. 1 would not require repositioning of the photodetector, however, since the measurements are made at the same radial position of the rotor assembly. A second photodetector, angularly displaced from the first, could be used and both fluorometric and photometric measurements made simultaneously. In that case, fluorescence excitation light pipe 13, head assembly 14, and photodetector 12 would remain as shown in FIG. 1 and a second photodetector would be axially aligned with photometer light pipe and mirror assembly 11 at a position angularly displaced from photodetector 12. The alternative embodiment of FIGS. 4 and 5 requires radial shifting of photodetector 12 to change from a fluorometric to a photometric mode when only one photodetector is used.

Figure 6:
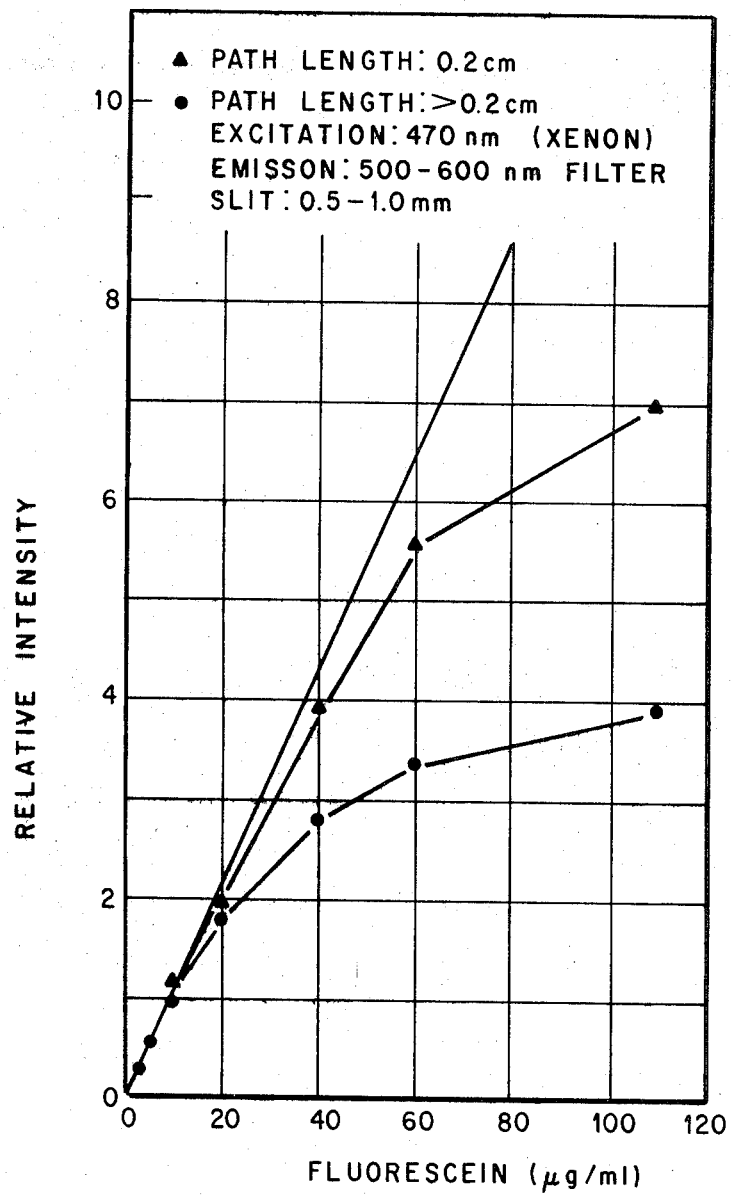
FIG. 6 is a plot of relative intensity versus fluorescein for cuvettes having 0.2 and greater than 0.2 centimeter path lengths.

FIG. 6 is a plot of relative intensity versus fluorescein showing the results of dynamic fluorescence measurements. Test results plotted in that figure illustrate the effect of excitation light path length upon the measurable range of solute concentration.

The cuvettes of a dynamic, multistation photometer were modified in accordance with the embodiment of FIGS. 4 and 5 and utilized as fluorescence cuvettes under dynamic conditions. A collimated beam from a 470 mm xenon excitation source, using a 0.5–1.0 mm slit width, was allowed to impinge upon the surfaces of the cuvettes at an angle of incidence of 30°. Fluorescence emission passed through a 500–600 mm filter was detected at an angle normal to the cuvette surfaces. Relative intensitites were measured for solutions containing fluorescein in buffer in concentrations up to 100 micrograms/ml. Measurements were made under identical conditions except that two different path lengths were used for surface excitation. In one case the path length was 0.2 cm and in the other about 0.5 cm. FIG. 6 clearly shows that the use of the shorter path length provided a much greater linear range of concentration determination.

Figure 7:
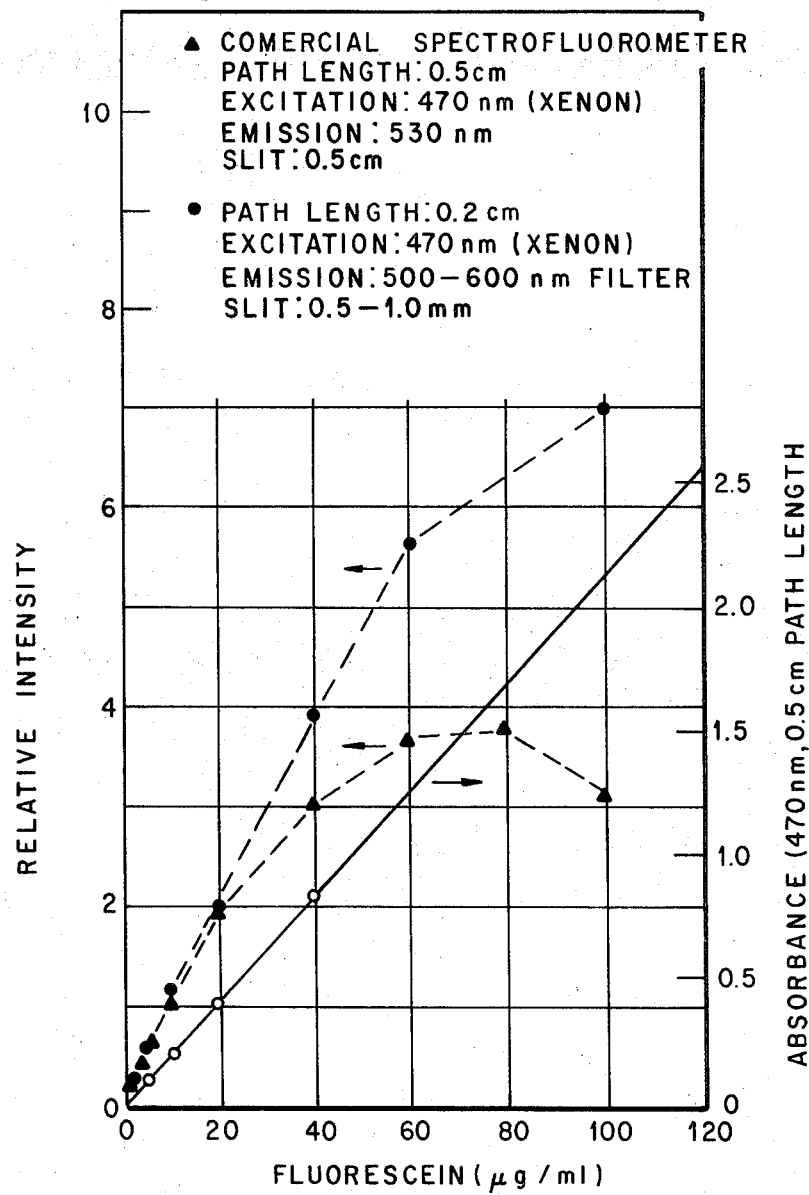
FIG. 7 is a plot of relative intensity and absorbance versus fluorescein comparing the performance of a prior art fluorometer and the subject invention.

In a second experiment, a commercially available spectrofluorometer having a 0.5 cm path length was compared with a dynamic, multistation photometer modified in accordance with FIGS. 4 and 5 to provide a 0.2 cm path length. The results obtained are plotted in FIG. 7 which shows a comparison of the relative intensities of the emission values obtained with increasing fluorescein concentration. It is noted that, with the 0.5 cm path length instrument, intensity actually decreased beyond a fluorescein concentration of about 80 micrograms/ml, thus rendering solute concentrate analysis beyond that value meaningless. However, the curve for the modified 0.2 cm path length instrument indicates that measurement is possible over a much extended concentration range.

Ancillary electronic components for utilizing the photodetector output and providing a display of results for the respective cuvettes under dynamic conditions are described in U.S. Pat. No. 3,514,613, of common assignee. Those components will not be described here inasmuch as the invention in this case is an improvement restricted to the mechanical design of the cuvettes and the associated light source and photodetector placement and does not encompass the associated electronic components and circuitry described in the patent.

The foregoing description of two embodiments of the invention is offered for illustrative purposes only and should not be interpreted in a limiting sense. For example, more than one photodetector may be used so that photometric and fluorometric measurements can be made simultaneously. It is intended, rather, that the invention be limited only by the scope of the claims appended hereto.

What is claimed is:

1. A combined fluorometric-photometric solution analyzer for the simultaneous determination of solute concentration in a multiplicity of discrete samples comprising:
   a. a rotor assembly defining a multiplicity of sample analysis cuvettes, said cuvettes each having:
      i. a shallow portion bounded on one side by a transparent window and on the opposed side by an opaque wall disposed in parallel with said transparent window; and
      ii. a portion of greater depth than said shallow portion bounded on two sides by transparent windows disposed in parallel;

b. means for directing an excitation light beam through said transparent wall bounding said shallow portion and into said shallow portion;
c. means for detecting fluorescence emitted from sample solution within said shallow portion;
d. means for directing a light beam through said portion of greater depth; and
e. means for detecting light transmitted through said portion of greater depth.

2. The combined fluorometric-photometric solution analyzer of claim 1 wherein said shallow portion is no more than 0.2 cm in depth and wherein said portion of greater depth is about 1 cm in depth.

3. The combined fluorometric-photometric solution analyzer of claim 2 wherein said opaque wall comprises a groove-mounted removable shim.

* * * * *

UNITED STATES PATENT OFFICE
CERTIFICATE OF CORRECTION

Patent No. 3,763,374   Dated Oct. 2, 1973

Inventor(s) Thomas O. Tiffany et al.

It is certified that error appears in the above-identified patent and that said Letters Patent are hereby corrected as shown below:

In line 7 of the abstract, the hyphen (-) between "0.1" and "0.2" should be an arrow (→).

Column 1, line 18, "arrnage-" should be ---arrange- ---; line 20, a period (.) should be inserted after "Pat".

Column 2, line 14, "souce" should be ---source---; line 54, "21" should read ---1---.

Column 4, line 5, "mm", first occurrence, should read ---nm---; line 8, "mm" should read ---nm---.

Column 6, line 6, "2" should read ---1---.

Signed and sealed this 16th day of April 1974.

(SEAL)
Attest:

EDWARD M.FLETCHER,JR.
Attesting Officer

C. MARSHALL DANN
Commissioner of Patents